Patented Aug. 2, 1938

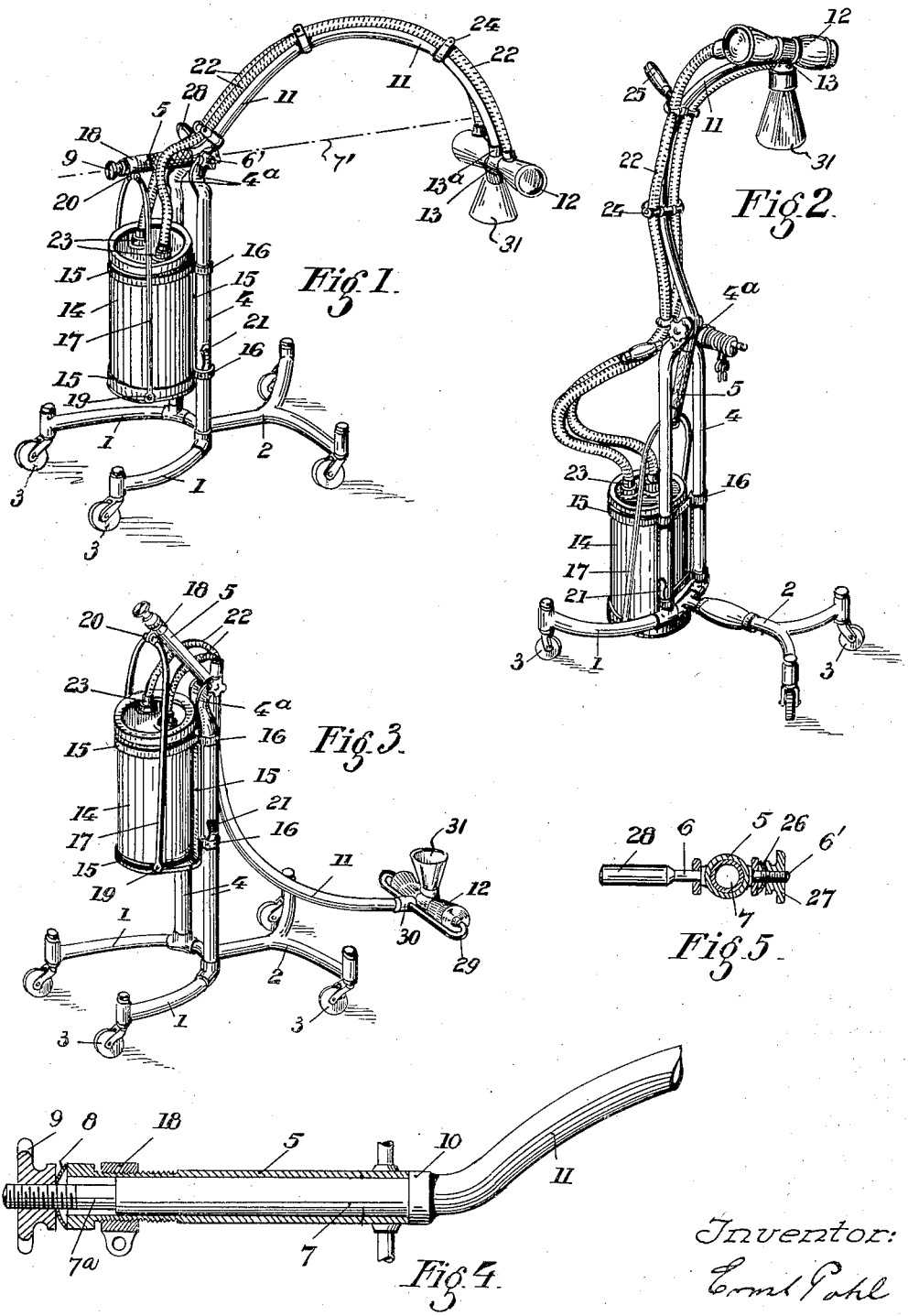

2,125,586

UNITED STATES PATENT OFFICE 2,125,586

STAND, MORE PARTICULARLY FOR RÖNTGEN APPARATUS

Ernst Pohl, Kiel, Germany

Application November 7, 1933, Serial No. 697,057
In Germany November 7, 1932

6 Claims. (Cl. 248—123)

The present invention relates to an adjustable stand for certain apparatus and appliances, more particularly Röntgen apparatus, said stand being adaptable to a great variety of conditions and easily adjustable, while offering a substantially total balance of weight in every position. A medical apparatus mounted on the stand may as advantageously be used at a sick-bed and even at a low stretcher as at a usual operation or diagnostic chair or table, the stand being thus constructed that the apparatus carried by the same may be moved down to the floor and given any desired direction of operation. At the same time the stand requires very little room, so that it may even be placed between beds which are at a little distance from each other, for instance for making Röntgen observations in every direction as from above, from below and from the side.

The supporting arm of the stand is thus formed that for example a Röntgen tube mounted at its free end may be moved over and across the patient in order to transradiate the same in the direction towards the physician who is placed before the bed or stretcher and holds the Röntgen screen, particularly for the observation of bone fractures.

Furthermore the easily movable stand may advantageously be used by dentists in connection with Röntgen apparatus for dental photography at the usual dentist operation chairs. The wholly erected stand is so little cumbersome that it may even have a permanent place in a small operation room.

The drawing illustrates two embodiments of the invention specially adapted for Röntgen apparatus, the stand being however also applicable for other kinds of medical apparatus or to other appliances of any kind with which the use of an adjustable stand is usual or advisable.

Fig. 1 is a perspective view of one constructional form of the stand supporting a Röntgen apparatus and having a curved supporting arm being in substantially horizontal position in which it extends over and across the patient with the concave side of the curvature downward.

Fig. 2 shows the same stand with the supporting arm in completely elevated position.

Fig. 3 is a perspective view of a somewhat modified stand in a third position for transradiation from below, the supporting arm being almost completely moved down and having its concave side turned upward.

Figs. 4 and 5 show details.

The stand constituted of metal tubes and being of relatively low weight comprises a foot composed of a U-shaped portion 1 and a Y-shaped portion 2 and is movable on four castors 3 mounted on the ends of the U- and Y-shanks. On the U-portion 1 two vertical columns 4 are mounted, the upper ends 4a of which are sharply bent toward each other and then bent in the direction of the Y-shaped foot portion. The free ends 4a form a pair of supports for two pivots 6, 6' fixed on a bearing sleeve 5. At the outwardly projecting end of the pivot 6 a handle 28 serving to displace the stand is mounted. The threaded end of the pivot 6' supports a resilient brake disc 26 and a hand nut 27 by means of which the frictional resistance against tilting movement of the sleeve 5 may be controlled as desired. The sleeve 5 receives an axle 7 having an annular abutment 10 at one end and a reduced and threaded portion 7a at the other end. This reduced end supports a spring brake disc 8 and a thumb nut 9, so that also the frictional resistance to the turning of the axle 7 may be controlled. A tubular curved supporting arm 11, at the free end of which a Röntgen tube casing 12 having a funnel 31 for the passage of the rays is supported, is joined to the axle 7 at the side of the abutment 10 with a sharp sideward bend, so that the rotation axis 7' of the axle 7 and arm 11 forms a chord of the curvature arc of the arm. The casing 12 is mounted within a sleeve 13 loosely surrounding its middle portion, so that the casing may be turned about its longitudinal axis. The sleeve 13 may in turn be revolvably mounted on the end of the arm 11 by means of a lateral projection 13a, so that the Röntgen tube is cardanically movable with respect to the arm 11.

The transformer 14 is placed within a cage 15 guided by means of rings 16 on the standards 4 and pivotally suspended by means of two curved links 17 to a ring 18 mounted and longitudinally movable on the tube 5, the links being pivotally connected with the cage 15 and ring 18 at 19 and 20. Thus the transformer is acting as a counter-weight for the arm 11 and the Röntgen tube. On one of the guide rings 16 a leaf friction spring 21 is arranged acting upon the column 4.

The U-shaped portion 1 of the foot permits the movement of the transformer nearly down to the floor. On the supporting arm 11 there is a handle 25 permitting a more easy moving of the arm.

In the construction shown in Figs. 1 and 2 the conductors 22 are going from the terminals 23 of the transformer to the Röntgen tube separately on the outside of the arm 11 on which they are supported by suitable guide members 24. In the construction shown in Fig. 3 the conductors 22 pass through the tubular arm 11, whereby they act as a flexible shaft so that as the Röntgen tube casing 12 is turned about the axis of the projection 13a the transformer 14 revolves correspondingly about its axis. The rotation of the transformer may be facilitated by supporting it on a point in the centre of its bottom or in any other suitable way.

According to Fig. 3 the casing 12 of the Röntgen tube is rotatably mounted in a fork 29 the shanks of which receive the conductors 22 and which are rotatably mounted in the end of the tubular arm 11 by its middle portion 30.

The form of the supporting arm 11 is such that its end portion with the Röntgen tube and casing connected thereto lies on one side and its main portion on the other side of the axis 7' which passes through the centre of gravity of the whole unit, so that the arm with tube is balanced in every position.

In both constructions shown the curvature arc of the arm has a center angle of less than 180° so that the cross rotation axis of the Röntgen tube coinciding with the axis of the end portion of the arm and the axis 7' are forming an acute angle, for instance of 45° with one another.

Due to the curvature of the supporting arm 7, to the situation of its rotation axis 7' in the line of a chord of the curvature arc and to its ability to swing about the horizontal pivots 6, 6' the apparatus supported by the stand may be used in a great variety of positions and for a correspondingly large variety of work as exemplified by Figs. 1, 2 and 3 of the drawing.

For example, in the position of the arm according to Fig. 1 a patient lying on a bed or other support may be transradiated from above, or by positioning the stand closer to the bed the arm 11 may be caused to extend across the patient and by turning the tube about its own axis the ray funnel 31 may be directed against the stand, in order to transradiate the patient transversely towards the physician placed before the bed and holding the screen. By turning the arm about 90° from the position shown in Fig. 1 about the axis 7' a horizontal direction is given to the funnel 31 so that a transradiation of a sitting or standing patient is possible.

By swinging the arm upwards and directing the funnel 31 downwards as shown in Fig. 2 the patient may be transradiated on the bed at a greater distance. Of course intermediate positions may be given to the arm 11 to position the Röntgen tube in different heights. An extreme lowered position of the arm 11 is shown in Fig. 3 in which the end portion of the arm with the Röntgen tube adopts a nearly horizontal position, close above the floor so that it may be inserted beneath a bed or stretcher in order to transradiate the patient from below. In this position of the arm 11 it would even be possible to transversely transradiate a patient lying on the floor or on a very low couch not sufficiently distant from the floor for permitting the insertion of the Röntgen tube below it by simply directing the funnel 31 to the right or by turning the fork 29 about the sleeve 30 by 90° in one or the other sense to give the funnel a more or less horizontal direction.

The stand described may be used as above stated to support apparatus of other kinds for medical or other purposes for which it offers similar advantages, for instance irradiation apparatus. If in any application a transformer or other source of electric current is not necessitated, a simple counter-weight will take its place. But of course, when an apparatus comprising a source of current is employed in such case, this source may also serve as a simple counter-weight.

I claim:

1. A stand for a medical apparatus, more particularly for a Röntgen tube, comprising a base, a curved supporting arm and means for supporting said arm on said base for pivotal movement in a substantially vertical plane and for rotation about an axis forming a chord of the curvature arc.

2. A stand for a medical apparatus, more particularly for a Röntgen tube, comprising a base, a curved supporting arm having an extension at one end in line with a chord of the curvature arc and forming an axle, a bearing for said axle, said bearing being pivotally mounted on said base with the pivot axis crossing the axis of said axle and bearing.

3. A stand for a medical apparatus, more particularly for a Röntgen tube, comprising a base, a curved supporting arm and means for supporting said arm on said base for pivotal movement in a substantially vertical plane and for rotation about an axis forming a chord of the curvature arc, said arm being adapted to receive the medical apparatus, more particularly a Röntgen tube at its free end, said free end crossing the axis of rotation so that an apparatus supported by the arm will be in opposition to the main portion of the arm with relation to the rotation axis.

4. A stand for an electrical medical apparatus, more particularly for a Röntgen tube, comprising a base, a curved supporting arm, means for pivotally supporting said arm on said base upon a substantially horizontal axis, means for supporting said arm for rotation about an axis being in line with a chord of the curvature arc, means provided at the end of said curved arm adapted to receive an electrical medical apparatus, said arm comprising a rearward extension, a movable support adapted to receive a source of electrical energy, and means for suspending said support to said rearward extension.

5. A stand according to claim 1, in which the curvature of the arm extends over a center angle of less than 180°, so that its end forms an acute angle with the rotation axis.

6. A stand for an electrical medical apparatus, more particularly for a Röntgen tube, comprising a base, a curved supporting arm, means for supporting said arm on said base for pivotal movement in a substantially vertical plane and for rotation about an axis being in line with a chord of the curvature arc, means provided at the end of said curved arm adapted to receive an electrical medical apparatus, means adapted to receive a source of electrical energy, and current conductors carried by said supporting arm and adapted to connect said source and apparatus when these are in place on the stand.

ERNST POHL.